(No Model.)
J. W. HODGES.
PROCESS OF AND APPARATUS FOR MANUFACTURING GAS.
No. 255,786. Patented Apr. 4, 1882.
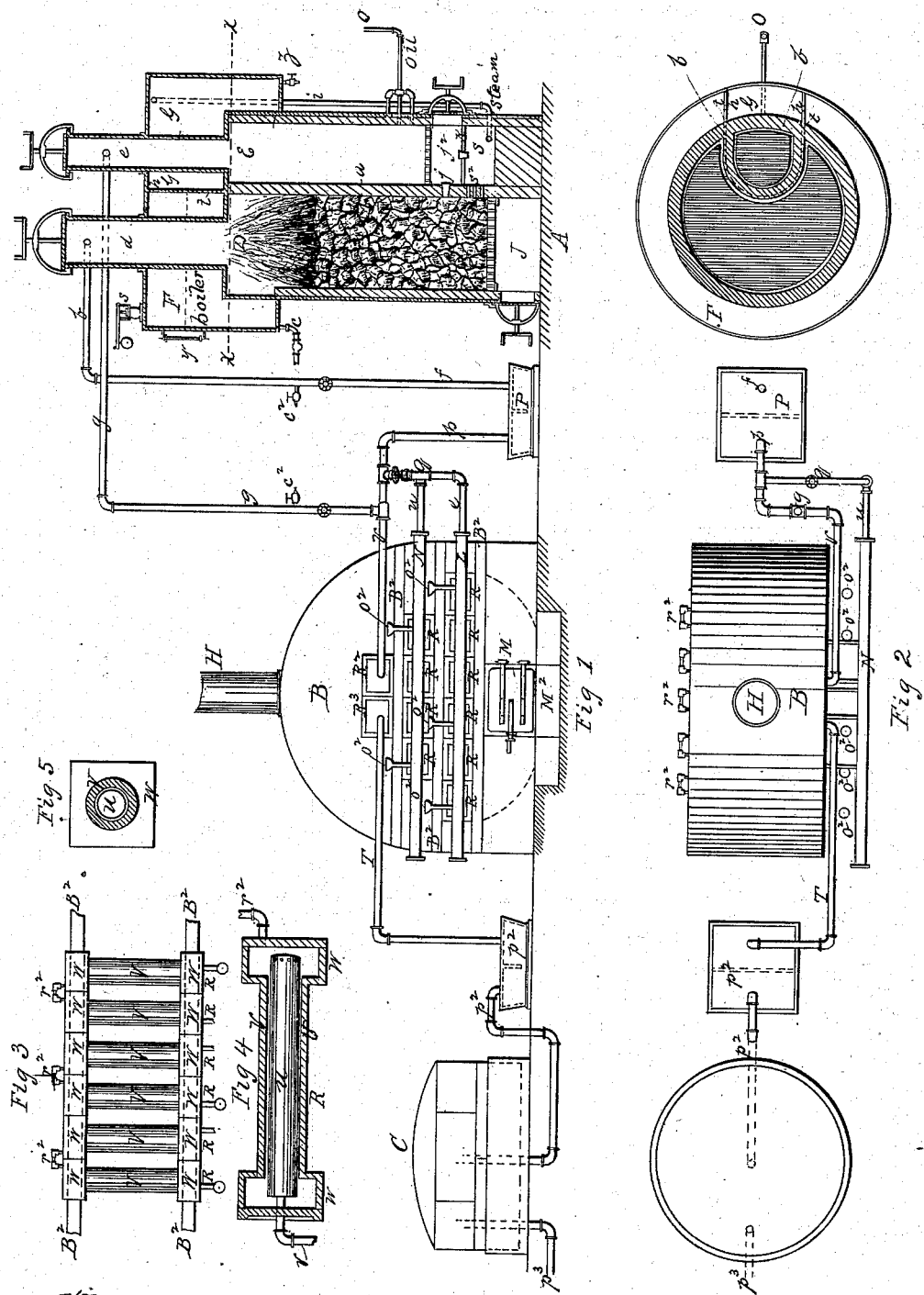
Witnesses
Henry J. Heath
R. H. Wheeler
Inventor.
James W. Hodges
by P. R. Voorhees
Attorney

UNITED STATES PATENT OFFICE.

JAMES W. HODGES, OF NEW YORK, N. Y., ASSIGNOR TO THE INTERNATIONAL GAS COMPANY, OF SAME PLACE.

PROCESS OF AND APPARATUS FOR MANUFACTURING GAS.

SPECIFICATION forming part of Letters Patent No. 255,786, dated April 4, 1882.

Application filed March 15, 1881. (No model.)

*To all whom it may concern:*

Be it known that I, JAMES W. HODGES, of New York, in the county and State of New York, have invented certain new and useful Improvements in the Process of and Apparatus for Manufacturing Gas for Illuminating and Heating Purposes, which improvements are fully set forth and illustrated in the following specification and accompanying drawings.

The objects of this invention are to obtain a maximum of economy in materials consumed, coupled with maximum efficiency of apparatus employed. Few, if any, of the generators heretofore used approximate with sufficient closeness the generation of the amount of gas theoretically obtainable by the decomposition of hydrocarbon oils.

The invention relates more particularly to that class of gas-works known as "water-gas generators;" and it consists in a novel construction and arrangement of parts and combinations of devices for the decomposition of water or steam and the generation of carbureted-hydrogen gas, the water-gas and the heavy carbureted gas being successively mixed, fixed, and remixed and stored for use, as hereinafter more particularly described.

In the said drawings, Figure 1 is a side elevation of the complete generating and mixing apparatus, partly in section. Fig. 2 is a plan of the plant shown in Fig 1, also partly in section at the line $x$ of Fig. 1. Fig. 3 shows a row of retorts detached from the bench of retorts illustrated in the preceding figures. Fig. 4 is a section through one of the two upper superheating or fixing retorts shown in Fig. 1. Fig. 5 is a cross-section through the retort shown in Fig. 4.

In the said figures, the letter A designates the cupola as a whole; B, a bench of retorts for the generation of gas, preferably from oil of any suitable character; C, the final mixing-chamber before the gas enters the storage-reservoir or gasometer.

The cupola A is preferably cylindrical in shape, of iron, lined with some refractory material, and is divided into two furnaces, D and E, by a wall of fire-brick, clay, or other refractory material, curved and built into the lining of the cupola, as seen at $b$, Fig. 2. On top of the cupola is built an annular water-jacket or evaporator and dry-chamber, F G, divided by a partition, $t$, into the water-chamber or evaporator proper, F, and the dry-chamber G, open to each other through the holes $h$ in the partition $t$.

The bench of retorts B is of the usual form of bench, provided with an ordinary furnace-door, M, and ash-pit $M^2$. The retorts R in this bench are of peculiar form, and are set therein in a novel manner. Said retorts have square ends W and a circular mid-section, V, as shown in Figs. 3, 4, and 5. They are set in bench upon flat horizontal bars $B^2$, of iron or other suitably refractory material, interposed between the tops of one row of retorts and the bottoms of the row next above. By this method of setting, one or more of the retorts can be removed from the bench and reset or renewed with but little or no disturbance of the brick-work. The retorts $R^2$ and $R^3$ in said bench are more especially "fixing" or superheating retorts, preferably of clay; and in said retorts are preferably inserted iron tubes or smaller retorts $u$, fitting the circular part of the outer retort neatly, with proper allowance for expansion and contraction. These inner retorts are united to or communicate with the entrance and exit pipes for the gas in any suitable manner, and are preferably partly closed or contracted in area at each end, more particularly at the exit, in order to slightly retard the flow of gas therethrough.

The mixing-chamber C is a small tank inverted in another tank of water, and divided, if desired, by any suitable partitions, passages, or screens for retarding the flow of gas, cooling it, and causing the more thorough intermixing of its different elements and the deposit of any oily or tarry matter. From the mixing-chamber C the gas is conducted in a suitable pipe or pipes, as illustrated in the drawings, by the pipe $p^3$, to any storage-holder or gasometer.

The complete operation of this plant and its advantages as a practical and efficient apparatus for satisfactorily answering varied requirements as a generator of either an illuminating or a heating gas, and in furnishing either a so-called "water-gas" and a "coal-gas," or an "oil-gas," either with or without an intermixture of air therewith, will now be described.

The cupola A being properly charged in each furnace with coal or other suitable material of a carbonaceous or other nature, and the evaporator F being partly filled with water, as indicated by the dotted lines opposite the water-gage Y, the cupola is ready for use. The furnaces D and E are then ignited, the several doors or plates being removed from the chimneys $d$ and $e$ and ash-pits J $J^2$. When the material in the furnaces has arrived at the proper point of combustion and ignition said doors are tightly closed, excluding the atmosphere from the furnaces. By this time steam has formed in the evaporator F, and if above a safe degree of pressure the excess will escape through the safety-valve $s$. The steam thus formed will fill the dry-chamber G by passing through the holes $h$ in the partition $t$. From the dry-chamber G the steam is led by the pipe $i$ into the superheating-chamber S, whence it passes through the holes $s^2$ into the bed of the fuel in the furnace D, where the steam is decomposed and transformed into hydrogen impregnated with carbonic oxide, if said fuel be carbonaceous. While this decomposition is going on in the furnace D oil is being fed into the furnace E through the pipe O, which may be branched, as seen in the drawings, to distribute the oil in separate jets or streams therein, and wherein it is decomposed into a carbureted-hydrogen gas. These gases, thus separately generated, then pass out of their respective furnaces, the hydrogen impregnated with carbonic oxide, through the pipe $f$, into and through the purifier P, thence, as purified, through the pipe $p$, wherein it meets the nascent carbureted hydrogen from its furnace E, yet unwashed, and wherein also it meets a current of gas from the retorts in the bench B, whence all the gases then pass into and through the superheating and fixing retorts $R^2$ and $R^3$, and thence through the pipe T into the washer or purifier $P^2$, from which the pipe $p^2$ leads into the mixing-chamber C, already described. From said chamber the gas passes into the holder through the pipe $p^3$, for consumption.

The retorts in the bench B are so arranged and fed that but one of each pair is fed with oil, which passes first into one, and its gases or vapors then pass out of that retort into the next retort, and thence into one of the mains L and N. One retort of each pair thus becomes, through one of the pipes $O^2$, a receiving and generating retort, and the other, through one of the pipes $r^2$, a superheating and fixing retort for the bench of retorts previous to the final superheating and fixing in the upper retorts, $R^2 R^3$.

The evaporator F may be fed with water in any suitable manner, but preferably through a pipe provided with a check-valve, $c$, as shown in Fig. 1. Any water of condensation that may collect in the dry-chamber G is drawn off through the drip-cock Z.

The several steam, gas, and oil pipes are all provided with suitable cocks or valves, as shown in the drawings, in order to change or regulate the flow of the fluids and gases as may be desired, or to shut off, if occasion should require, the cupola A and bench B. In works where steam-boilers are used from which sufficient steam can be obtained, the evaporator F can of course be dispensed with. The steam from such boilers can then be led directly into the superheating-chamber S.

The cock $c^2$ in the pipe $g$ may be fitted with any suitable burner or tip for testing the quality of the gas produced by the reactions in the furnace E.

The ash-pit $J^2$ is closed to the superheating-chamber S by means of the plug $k$, set in the bottom of the ash-pit. It may also be closed to the furnace D by means of a plug, $a^2$, set in the wall $a$, separating the two furnaces D and E. These plugs of course, like the partitions in which they are inserted, should be of some highly refractory material. If at any time it should be desired to put these furnaces into communication, either or both of these plugs can be removed, and either steam alone or oil, or both, may then be introduced into the furnaces, and to either the top or bottom of the furnaces, as may be desired.

Into the furnace E may be introduced an inner iron retort, similar to the retort already described and shown within the retorts $R^2 R^3$. The object of using said inner retorts or tubes, which may be partly filled, if desired, with iron turnings or borings or any suitable purifying or deoxidizing agents, is for their decomposing and purifying action upon the steam, and when their purifying quality or that of their contents is exhausted, said tubes or retorts, being comparatively thin and of light weight, can be in a moment removed and fresh ones substituted. The expense attending such renewals, even if quite frequent, will not be great, their first cost being small, and the old ones being capable of being recast into new.

Instead of a single inner tube or retort, as used in the retorts $R^2 R^3$, a number of smaller tubes may be introduced into the furnace E for the same purpose, forming a series or nest of tubes, into which either the oil or steam, or both, may be introduced, as well as into the bed of the fuel, or into said tubes instead of into the bed of the fuel.

I do not confine myself to the use of any particular decomposing material or fuel, whether carbonaceous or not, in the furnaces, and in the furnace E in particular either coal alone or a mass of broken brick or a mixture of coal and burnt clay may be placed, as may best secure a large surface for the storage and economical retention of the heat therein. The furnace E may also in some cases be so proportioned as not to require the starting of a fire upon its grate, the heat derived from the furnace D through its walls and stored up in the furnace E being sufficient for the reactions required therein. Holes stopped with plugs of fire-clay or other refractory material may also, if desired, be put in the wall or between the two furnaces, in order, by the removal of said plugs, to allow the gases generated in the two furnaces to intermingle; but said furnaces are preferably kept separate and closed to each other.

This plant, it is now obvious, will permit of the most perfect and accurate adjustment of the quantities of all the materials to be used and consumed and of the temperatures required to effect most economically the necessary decompositions, and also of the relative proportions for mixture of each of the gases as generated and their intimate mixing and fixing into a permanent gas of any desirable illuminating or heating power within a fair range of useful limits. By means of this plant, also, a heating-gas can be readily generated for a certain number of hours and stored in one holder, and then by the simple change of a few cocks or valves the apparatus is transformed into a generator for illuminating-gas, a second holder only being required for its storage. All of these advantges are obtained from a simple plant of moderate first cost, and in practice susceptible, upon either a large or small scale, of yielding highly economic results.

I attach great importance to the respective locations of the purifier P and the mixing-chamber C, the former for depurating the decomposed steam, particularly, if desired, when charged with carbonic oxide, and the latter for surely and intimately mixing the gas before it passes into the holder—a matter of great importance if the gas be rapidly consumed from the holder. Indeed, a prominent feature of this plant is the successive and numerous decompositions and mixings effected by it of comparatively small volumes of the different gases and their constituents during the process of generation and conversion. Both time and opportunity for intimate mixture and permanent fixing are thus specially provided for—features which are not nearly so well provided for in any gas-generating apparatus with which I am familiar. But it will be observed that the carbureted-hydrogen gas is not subjected to any washing process until after its mixture with and all its most valuable light-giving properties have been imparted to the purified decomposed steam or hydrogen, and to this feature of my said plant I attach great importance, and it is one entirely neglected in the ordinary methods of generating water-gas enriched by mixture with carbureted hydrogen, as far as is known to me.

The purifier P may be charged with any suitable purifying material, and I do not herein claim any agents therefor, nor confine myself to the use of any special substance or matter as a purifying or washing agent in any stage of the process.

Having thus fully described my said invention and the mode of operation thereof, I claim—

1. The process of generating illuminating-gas, consisting in decomposing water or steam in contact with fuel in a state of ignition in one furnace and decomposing in a similar manner, though at a different temperature, a hydrocarbon oil in contact with ignited fuel in another and separate furnace, as described, then mixing the gases so produced before washing or purifying the gas derived from the oil, and then subjecting said mixture, previous to storage for consumption, to such purifying, superheating, and cooling as may be required, as described, all substantially as set forth.

2. A cupola or generator, preferably of cylindrical form, for the production of gas by the decomposition of oil and water, divided into two decomposing-furnaces provided each with separate fuel-grates, charging-doors, and ash-pits, and one of said furnaces with a pipe for conducting oil alone into contact with ignited fuel therein, and the other with a pipe for conducting water or steam alone into contact with ignited fuel therein, and each of said furnaces with a pipe for discharging therefrom its respective gaseous products of the decomposed steam and oil, as described, whereby the relative temperatures of the furnaces in which the respective gases are generated and the respective quantities of said gases therein generated are regulated and controlled previous to admixture for use, and the quality of their mixture likewise regulated, substantially as set forth.

3. In combination with and secured to the top of a cupola or generator, an annular water jacket or evaporator connected with a furnace within said cupola through an intermediate superheating-chamber situated below said furnace, whereby the vapor of water is first superheated and then decomposed, substantially as and for the purposes set forth.

4. In a cupola or generator provided with separate decomposing-furnaces for steam and hydrocarbons, a steam-superheating chamber heated by the walls of the steam-decomposing furnace and open to the fuel therein, below the bed of fuel, in the hydrocarbon-decomposing furnace, substantially as and for the purposes set forth.

5. In a cupola or generator provided with separate decomposing-furnaces for steam and hydrocarbons, a steam-superheating chamber heated by the walls of the steam-decomposing furnace and open to the bed of fuel therein, below the bed of fuel in the hydrocarbon-decomposing furnace, and provided with means for uniting said furnaces through said chamber when desired, substantially as and for the purposes set forth.

6. In combination with a cupola or generator provided with separate furnaces for decomposing steam and hydrocarbons at high temperatures, a superheating retort or retorts and an interposed purifying box or chamber, all suitably connected by pipes, as described, whereby the hydrogen of decomposed steam is first purified and then brought in contact in said retorts with the nascent or unwashed gases of a hydrocarbon previously decomposed at a high temperature, said gases being therein permanently fixed, substantially as set forth.

7. In combination with a cupola or generator provided with separate furnaces for decomposing steam and hydrocarbons at high temperatures, a series of superheating-retorts for generating carbureted-hydrogen gas, arranged with furnace for heating the same in bench, and connected by suitable pipes to said cupola, whereby the respective temperatures necessary for decomposing the steam and hydrocarbon employed can be accurately regulated at will, and the relative proportions of their resultant gases, as desired for mixture, also varied at will, substantially as set forth.

8. In a bench of retorts for the generation of illuminating or heating gas, a series of retorts having square ends and a circular mid-section, as described, set in brick-work, with flat horizontal bars of iron or other suitable refractory material interposed at each end, between the top and bottom of each retort, and between the retorts and the courses of brick, whereby the retorts may be removed and reset or renewed with but little or no disturbance of the brick-work, substantially as set forth.

JAMES W. HODGES.

Witnesses:
SETH M. ELDREDGE,
R. F. WHEELER.